(No Model.)

G. HAYNES, Jr., & A. E. SCHAAF.
ANTI FRICTION BEARING.

No. 354,638. Patented Dec. 21, 1886.

WITNESSES.
Homer H. Fiske
Stedman Brettucks

INVENTORS.
Albert E. Schaaf
Gideon Haynes, Jr.
By Charles E. Pratt,
Atty

UNITED STATES PATENT OFFICE.

GIDEON HAYNES, JR., OF BOSTON, MASSACHUSETTS, AND ALBERT E. SCHAAF, OF BUFFALO, NEW YORK, ASSIGNORS TO THE POPE MANUFACTURING COMPANY, OF HARTFORD, CONNECTICUT.

ANTI-FRICTION BEARING.

SPECIFICATION forming part of Letters Patent No. 354,638, dated December 21, 1886.

Application filed October 19, 1885. Serial No. 180,290. (No model.)

*To all whom it may concern:*

Be it known that we, GIDEON HAYNES, Jr., late of Buffalo, but now of the city of Boston, in the State of Massachusetts, and ALBERT E. SCHAAF, of the city of Buffalo, in the State of New York, have jointly invented certain new and useful Improvements in Anti-Friction Bearings, of which the following is a specification.
Our improvements relate more particularly to the bearings for the axles of bicycles and other velocipedes, and to that class of bearings for such purposes known as "ball" or "roller" bearings, but may be equally applicable to the axles of other vehicles, or to shafts and journals of other machinery where accurate, light, and easy bearings adjustable to correct action and for wear are desirable.

Hitherto ball or roller bearings have been constructed in a variety of different forms, some of which were adjustable and some nonadjustable. Those which were adjustable were either laterally adjustable—that is, having their devices for adjustment to operate sidewise with reference to the bearing and box, and lengthwise on a shaft or axle—or else vertically adjustable—that is, so that the devices for adjustment were operated vertically to the bearing-box—and in the latter class its adjustment has been obtained at the expense of a crack or opening across the pathway of the balls very detrimental to the bearing.

It is among the objects of our invention to obtain an adjustment of the balls both for a good fit when new and for wear afterward by a vertical adjustment, while at the same time preserving a continuous track for the balls.

The nature of our improvements will be understood from the following description, taken in connection with the drawings, in which similar letters of reference indicate like parts.

Figure 1:
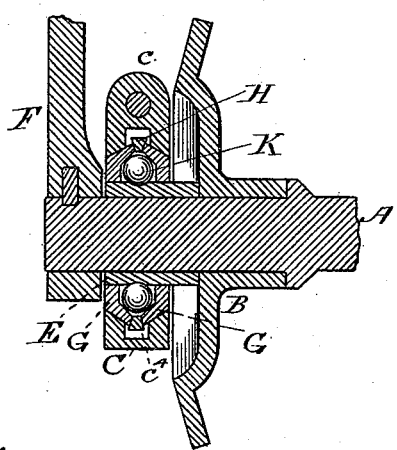
Figure 2:
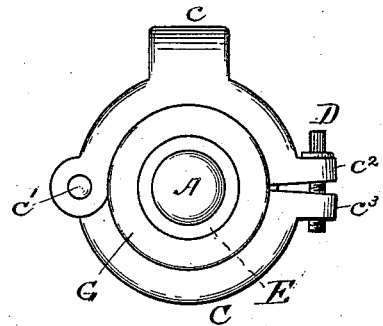
Figure 3:
Figure 4:
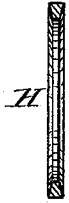
Figure 5:
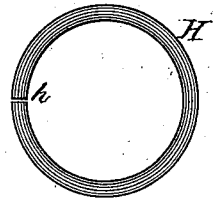
Figure 6:
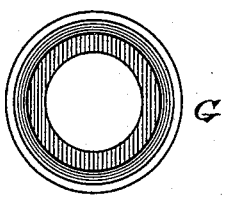

Figure 1 shows in vertical longitudinal section part of a bicycle axle, hub, flange, crank, and bearing containing our improvements in one form. Fig. 2 shows in side elevation the bearing-box and parts of the bearing assembled; and Figs. 3, 4, 5, and 6 show parts of the bearing in detail, Fig. 3 showing in elevation and Fig. 4 in part section one of the cone-edged adjusting-rings edgewise, and Fig. 6 showing the same in side elevation on the inside, which is adjacent to the rollers, and Fig. 5 showing in side elevation a beveled detent.

A is a shaft or axle. B is a hub-flange, and C is a bearing-box. In the devices shown the bearing-box C is made in two parts, as shown in Fig. 2, hinged together at $c'$, one having a lug, $c$, for adjustment to the frame of the bicycle, and each having a lug, $c^2 c^3$, to receive a bolt or screw, D, for securing them together on the opposite side from the hinge. This box C is constructed with a narrow annular chamber or recess, $c^4$, and on either side of it with beveled cylindrical lips or edges, which, if continued toward the middle plane of the bearing-box, would meet and form an angle farther from the axial line of the box than the outer portion of the beveled edges.

E is a sleeve on the shaft A, which may have a groove for the balls or rollers.

F is a crank keyed upon the axle A, and G G are two continuous rings, constructed so as to take a free bearing on the sleeve E, and to present conical or grooved surfaces on their inner proximate sides for contact with the balls or rollers K and to present peripheral surfaces, which if continued would form an angle farther from their axial line than the outer edges of these surfaces and corresponding with the angle of the cylindrical inner beveled surfaces in the box C.

H is an annulus or detent-ring, split at $h$, a little larger in its interior diameter than the exterior diameter of the row of balls or rollers, and with its sides beveled to correspond with the inner beveled sides of the rings G G, the general formation and relation of these beveled surfaces being shown in section in Fig. 1, and the space or recess $c^4$ being sufficient to allow considerable spread of the spring-detent H, and the spring-detent H being of sufficient thickness and sufficiently beveled to allow considerable approach of the bearing-rings G G when the detent H is enlarged or forced outward.

The operation of this contrivance in a bicycle-bearing is as follows: The sleeve E, case C, rings G G, detent H, and balls or rollers K are assembled together and held in position somewhat loosely by means of the clamp formed of the lips $c^2 c^3$ and bolt B, and are placed upon the shaft A, the sleeve E being held from revolving thereon by a small set-screw, or in any approved manner, and the case being held to the lug by or in any approved manner, and the whole held from lateral movement on the shaft by the flange B on one side and the crank F on the other, or in any approved manner, and the adjustment of the bearing is accomplished by turning the screw D so as to make the lips $c^2 c^3$ approach each other, thereby reducing the inner diameter of the case C and causing its beveled surfaces to press upon the beveled surfaces of the rings G G, which, by virtue of the angles of these meeting beveled surfaces, cause the rings G G to approach each other, and the inner conical or grooved surfaces forming a part of the balls to approach each other, so as to compress the row of balls around the sleeve E, while in this process the approach of the rings G G and the pressure of their inner beveled edges upon the detent H, by reason of the beveled surfaces, enlarges the detent H, causing it to spread at the split $h$. If the screw D be turned too far and the bearing thereby be made too tight, a slight loosening of the screw will relieve the pressure and the spring H will tend to return to its closed annular form, as shown in Fig. 5, pressing and holding apart the rings G G and relieving the contact-pressure of the rollers and their path in the rings and on the sleeve.

It is obvious that by this means a nice adjustment of the bearing may be obtained; that the path of the rollers is unbroken; that an easy, accessible, and vertical means of adjustment is obtained without the difficult and expensive large screws necessary where the bearing-box is divided and its parts caused to approach laterally, or the sleeve is divided and its parts caused to approach laterally, and that all the parts which form bearing-surfaces for the rollers, including the latter, may be polished and hardened.

It is obvious that formal changes may be made in the proportions and angles or arrangement of the parts of this contrivance such as any mechanic might make for adapting it for use in different vehicles or machinery, or with differently-shaped rollers, &c., and we therefore do not limit ourselves to the precise form of this device here shown and described.

We claim as new and of our invention—

1. In a ball or roller bearing box, the combination of a case divided longitudinally with reference to its axis, two or more rings having interior grooved or conical surfaces for contact with the balls or rollers, and exterior beveled or conical surfaces for contact with the case, and a means of contracting the case vertically upon the bearing-rings, and thereby causing the rings to approach laterally, essentially as set forth.

2. In an anti-friction bearing-box having parts with conical or grooved bearing-surfaces for contact with the balls or rollers, one of which parts is movable laterally for adjustment, an annular spring-detent, as H, constructed to operate between said parts and press them apart when they are loosened, and to yield and permit them to approach when they are tightened, substantially as shown and described.

3. In a ball or roller bearing box, the combination of a circular row of balls or rollers, bearing-rings having interior conical or grooved surfaces for contact with the balls or rollers, and exterior conical or beveled surfaces for contact with the case, a spring-detent operating as a yielding annulus between said rings within the case and out of the way of the balls or rollers, and a case divided longitudinally and provided with means of vertical contraction about the rings and of adjusting the rings laterally thereby, essentially as set forth.

4. An axle or journal bearing, substantially as shown and described, consisting in a series of balls or rollers operating about and upon the axle or a sleeve thereon, and within or against the conical or grooved surfaces in the box, two rings in the box bearing said conical or grooved surfaces for contact with the balls or rollers, and having exterior conical or beveled surfaces for contact with the case, and intermediate conical or beveled surfaces for contact with the detent, a spring-detent operating between said intermediate surfaces, a case divided longitudinally and having an internal groove and inwardly-beveled edges to bear upon said exterior surfaces of the rings, and a hinge and screw clamp in the case, all constructed and combined to operate by vertical contraction of the case to cause lateral approach of the rings and adjustment of the bearing, essentially as set forth.

GIDEON HAYNES, JR.
ALBERT E. SCHAAF.

Witnesses to signature of Gideon Haynes, Jr.:
  C. E. PRATT,
  H. H. FISKE.

Witnesses to signature of Albert E. Schaaf:
  FREDK. B. WALL,
  ARTHUR W. DECKER.